US006968066B2

(12) United States Patent
Yueh

(10) Patent No.: US 6,968,066 B2
(45) Date of Patent: Nov. 22, 2005

(54) WIRELESS HANDS-FREE APPARATUS WITH SOUND-ABSORBING FUNCTION

(75) Inventor: Wen Hsiang Yueh, Hsin Chuang (TW)

(73) Assignee: Partner Tech Corp., Taipei (TW)

( * ) Notice: Subject to any disclaimer, the term of this patent is extended or adjusted under 35 U.S.C. 154(b) by 2 days.

(21) Appl. No.: 10/724,130

(22) Filed: Dec. 1, 2003

(65) Prior Publication Data

US 2005/0117770 A1    Jun. 2, 2005

(51) Int. Cl.$^7$ ............................................. H04R 25/00
(52) U.S. Cl. ...................... 381/151; 326/380; 326/375; 455/100
(58) Field of Search ................................. 381/151, 326, 381/327, 328, 370, 380, 381, 384, 355, 361, 381/364, 375; 455/41.1, 41.2, 90.2, 90.3, 455/569.1, 575.2, 100; 379/430

(56) References Cited

U.S. PATENT DOCUMENTS

| | | | |
|---|---|---|---|
| 2,611,829 A | * | 9/1952 | Hazard ........................ 381/151 |
| 2,678,973 A | * | 5/1954 | Newman ..................... 381/151 |
| 6,519,345 B1 | * | 2/2003 | Yang ........................... 381/151 |

* cited by examiner

*Primary Examiner*—Huyen Le
(74) *Attorney, Agent, or Firm*—Rosenberg, Klein & Lee

(57) ABSTRACT

The present invention provides a wireless hands-free apparatus with a sound-absorbing function. The hands-free apparatus has improved talking quality when used with a bluetooth earphone. The hands-free apparatus has an earphone with a built-in wireless communication module therein, a membrane sound capture device for receiving the input of the sound wave and a connecting line connected between the earphone and the membrane sound capture device. The membrane sound capture device can receive the user's sound wave and propagate the sound by the wireless communication module of the earphone through the connecting line.

3 Claims, 4 Drawing Sheets

WIRELESS HANDS-FREE APPARATUS WITH SOUND-ABSORBING FUNCTION

BACKGROUND OF THE INVENTION

1. Field of the Invention

The present invention is a wireless hands-free apparatus with a sound-absorbing function, and especially relates to a membrane sound capture device. The membrane sound capture device can isolate the sound outside and prevent the noise from transmitting into the connecting line. Therefore, the transferring quality of the wireless and hands-free earphone with a sound-absorbing function is promoted and the noise is reduced.

2. Description of Related Art

The sound input device of the mobile phone is increasingly important with the popularization of communication products. Presently, a microphone is the essential device in sound transfer. Hence, the use of a microphone in mobile phone communications, and in receiving and recording a sound source, is common in human daily life. As a result, structural designs for microphones are obviously significant.

The prior art wired or wireless parts of the sound capture device of the hands-free earphone are classed as throat style, sound-absorbing style and out-connecting style. Reference is made to FIG. 1, which illustrates a prior art bluetooth earphone. The earphone comprises a bluetooth earpiece 1, a microphone 11 and a wireless communication module 12. The microphone 11 is set at the end of the bluetooth earpiece 1 and not only the user's voice but also the sound in the surrounding are captured by the microphone 11. For this reason, the communication quality is poor.

Reference is made to FIG. 2, which illustrates a conventional piezoelectric earphone 2 used in a mobile phone 6. The earphone 2 mainly comprises a plugging earphone 21, a piezoelectric microphone 22 and a connecting line 23. The connecting line 23 is connected to the mobile phone 6. An oscillating wave is generated by a contact between the piezoelectric microphone 22 and a human body and then transferred to the connecting line 23. The major drawback of sound tone conducted in this way is excessive bass (low-pitch portion) and insufficient high-pitch and medium-pitch portions. Therefore the voice is distorted and the voice quality is not ideal. Still another drawback is the inconvenience due to the wire connection of the earphone.

No matter what improvement is made, ambient sound is transmitted into the out-connected microphone, whether a piezoelectric microphone or a conventional bluetooth earphone, when communicating, and the quality of the communication is reduced.

SUMMARY OF THE PRESENT INVENTION

The object of the present invention is to provide a wireless and hands-free earphone with a sound-absorbing function to improve communication quality under any conditions.

The wireless and hands-free earphone with sound-absorbing function according to the present invention comprises an earphone with a built-in wireless communication unit therein, a membrane sound capture device to receive the sound wave, and a connecting line connected between the earphone and the membrane sound capture device. Therefore, the membrane sound capture device can receive the user's sound wave and transmit the user's sound to the wireless communication module of the earphone through the connecting line.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

When using a conventional piezoelectric microphone, a user must stick the microphone on his (or her) neck tightly to reduce the gap between the neck and the microphone. In this way, the interference with the communication quality caused by the sound of outside environment is reduced. However, some ambient sound may still reduce the quality of the communication.

Hence, the present invention provides a membrane sound capture device in a form similar to an electrotherapy tab. The membrane sound capture device sticks tightly to a user's neck and there is no gap between them; therefore, the interference caused by ambient sound is fully cut off. Combining the same with wireless communication technology may further reduce inconvenience when connecting the mobile phone with a line. A plurality of vent holes surround the membrane sound capture device; the vent holes can receive the vibration of the sound wave completely. The problem caused by excessive bass of the tone and lack of medium and high pitches in the tone is solved.

Figure 1:
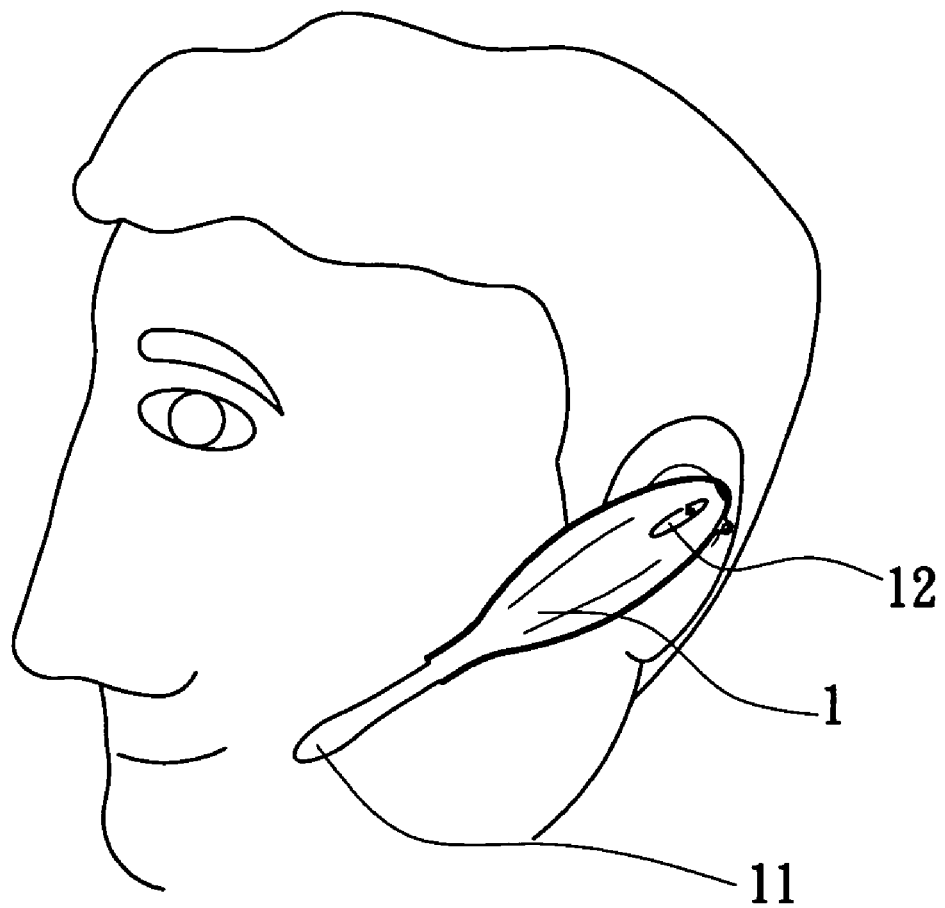
FIG. 1 shows a schematic view of a prior art bluetooth earphone.
Figure 2:
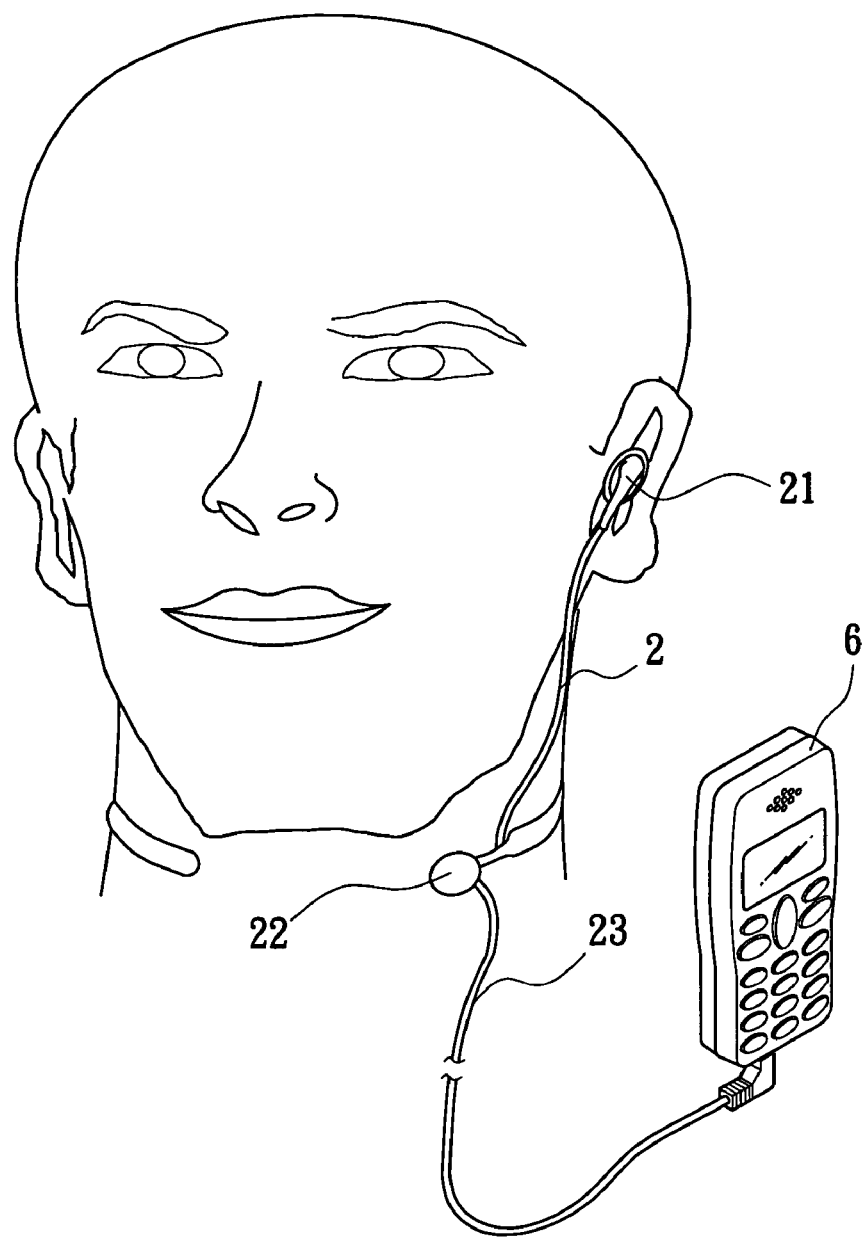
FIG. 2 shows a schematic view of a prior art piezoelectric earphone.
Figure 3:
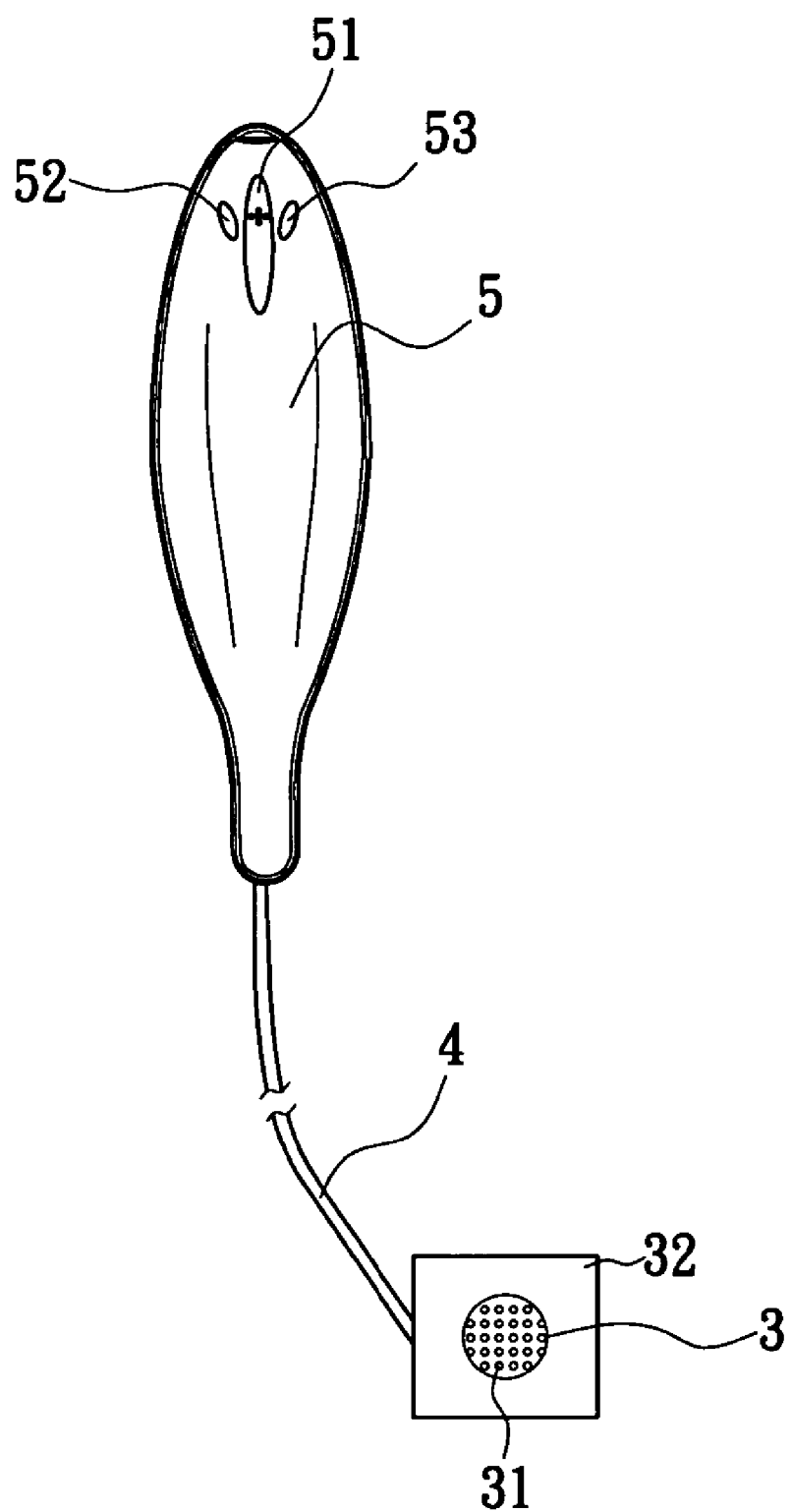
FIG. 3 shows a schematic view of the present invention.
Figure 4:
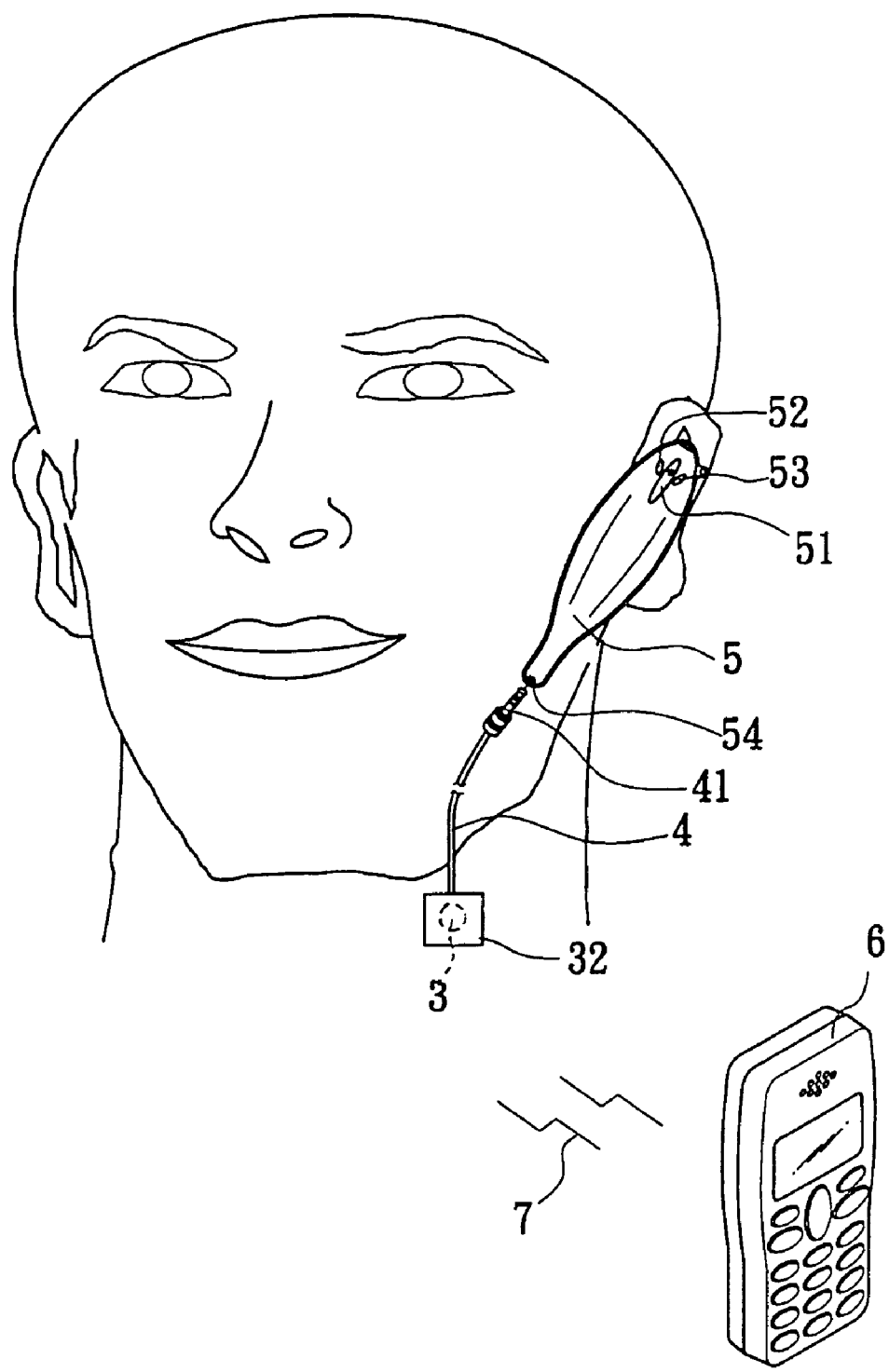
FIG. 4 shows a schematic view of an embodiment of the present invention.

Reference is made to FIG. 3, which illustrates a schematic diagram of the present invention and depicts a membrane sound capture device 3 with a plurality of vent holes 31 set inside the membrane sound capture device 3, an earphone 5 with a wireless communication module 51 and a connecting line 4 connecting the membrane sound capture device 3 with the earphone 5. The membrane sound capture device is stuck on a user's neck near the user's vocal cords (as shown in FIG. 4) by sticking layer 32. A volume-increasing button 52 and a volume-decreasing button 53 are embedded in the shell of earphone 5.

FIG. 4 illustrates an embodiment of the present invention. First, when a user talks, the sound wave produced by the vibration of the throat is transmitted to the wireless communication module 51 through the vent holes 31 of the membrane sound capture device 3. Then the sound is transmitted to a mobile phone 6 by wireless communication protocol 7 of the wireless communication module 51. Finally, the sound is sent out by the mobile phone 6. The connecting line 4 can be a fixed type, as shown in FIG. 3, or a removable type as shown in FIG. 4. An insertion hole 54 is defined on one end of the bluetooth earphone 5 and used with a removable plug 41 of the connecting line 4. The bluetooth communication module processes the output of the sound and sets the wireless communication protocol 7. A volume-increasing button 52 and a volume-decreasing button 53 are embedded in the shell of the mentioned bluetooth earphone 5 to control the user's speaking volume.

The present invention combines the bluetooth wireless communication technique and the membrane sound capture device, and can actually cut off ambient sound and resolve the drawbacks of too much bass and lack of alto and high pitches in the tone when using a piezoelectric microphone.

Although the present invention has been described with reference to the preferred embodiment therefore, it will be understood that the invention is not limited to the details thereof. Various substitutions and modifications have been suggested in the foregoing description, and other will occur to those of ordinary skill in the art. Therefore, all such substitutions and modifications are intended to be embrace within the scope of the invention as defined in the appended claims.

What is claimed is:

1. A wireless and hands-free earphone with a sound-absorbing function, comprising:
   an earphone with a wireless communication module therein;
   a membrane sound capture device for receiving input of a sound wave, the membrane sound capture device having an inward face on which a plurality of vent holes is formed;
   a connecting line coupled between the earphone and the membrane sound capture device; and
   a sticking layer disposed on the membrane sound capture device, the sticking layer operable to secure the inward face of the membrane sound capture devise in contact with a user;
   wherein the membrane sound capture device receives the user's sound wave and propagates sound by the wireless communication module of the earphone through the connecting line.

2. The wireless and hands-free earphone with a sound-absorbing function as in claim 1, wherein the wireless communication module is a bluetooth module.

3. The wireless and hands-free earphone with a sound-absorbing function as in claim 1, wherein an insertion hole is defined on the earphone and one end of the connecting line inserts into the insertion hole.

* * * * *